(12) United States Patent
Lepez et al.

(10) Patent No.: US 9,321,964 B2
(45) Date of Patent: Apr. 26, 2016

(54) METHOD AND APPARATUS FOR THE ENERGY DENSIFICATION OF A MATERIAL IN THE FORM OF DIVIDED SOLIDS, WITH A VIEW TO OBTAINING PYROLYSIS OILS FOR ENERGY PURPOSES

(75) Inventors: Olivier Lepez, Lamorlaye (FR); Philippe Sajet, Lacroix-Saint-Ouen (FR)

(73) Assignee: LEPEZ CONSEILS FINANCE INNOVATIONS—LCFI, Lacroix-Saint-Ouen (FR)

( * ) Notice: Subject to any disclaimer, the term of this patent is extended or adjusted under 35 U.S.C. 154(b) by 1017 days.

(21) Appl. No.: 13/318,994

(22) PCT Filed: May 4, 2010

(86) PCT No.: PCT/EP2010/056051
§ 371 (c)(1),
(2), (4) Date: Nov. 4, 2011

(87) PCT Pub. No.: WO2010/128055
PCT Pub. Date: Nov. 11, 2010

(65) Prior Publication Data
US 2012/0043194 A1 Feb. 23, 2012

(30) Foreign Application Priority Data
May 7, 2009 (FR) .................................... 09 02214

(51) Int. Cl.
*C10B 19/00* (2006.01)
*C10B 53/02* (2006.01)
(Continued)

(52) U.S. Cl.
CPC . *C10B 7/10* (2013.01); *C10B 53/02* (2013.01); *C10C 5/00* (2013.01); *Y02E 50/14* (2013.01)

(58) Field of Classification Search
CPC .......... C10B 7/10; C10B 19/00; C10B 53/02; C10C 5/00; C10G 1/02
USPC ............ 201/25, 32, 33, 41, 19; 202/105, 117, 202/118; 585/240, 242
See application file for complete search history.

(56) References Cited

U.S. PATENT DOCUMENTS 2,791,549 A * 5/1957 Jahnig ............................ 585/950
4,308,103 A * 12/1981 Rotter ............................. 201/25
(Continued)

FOREIGN PATENT DOCUMENTS

FR 2 788 260 A1 7/2000
FR 2 788 336 A1 7/2000
(Continued)

OTHER PUBLICATIONS
Machine translation of WO 2004/077966 (Sep. 2004).*
(Continued)

*Primary Examiner* — Jill Warden
*Assistant Examiner* — Joye L Woodard
(74) *Attorney, Agent, or Firm* — Sughrue Mion, PLLC

(57) ABSTRACT

A method and installation for energy densification of a material to obtain pyrolytic oils for energy. The method includes preconditioning the material by heating and drying to raise the material temperature close to 100° C. and a relative humidity not exceeding about 10%; pyrolyzing the material that is subsequently caused to flow through a substantially hermetic reactor containing at least one transfer screw or vibrating tube heated by the Joule effect, the material heated progressively in the range of 300° C. to 850° C., the electrical power passing through the transfer screw or the vibrating tube for providing heating regulated as a function of the material in order to obtain the desired temperature level during the transit time of the material through the reactor; extracting pyrolysis gas from a high portion of the reactor for rapid recondensation in a vertical condenser; and recovering pyrolytic oils from a low portion of the vertical condenser.

11 Claims, 3 Drawing Sheets

(51) Int. Cl.
    *C10B 7/10*     (2006.01)
    *C10C 5/00*     (2006.01)

(56) References Cited

U.S. PATENT DOCUMENTS

| | | | | |
|---|---|---|---|---|
| 6,375,345 | B1 * | 4/2002 | Lepez et al. | 219/209 |
| 8,476,480 | B1 * | 7/2013 | Brown et al. | 585/242 |

FOREIGN PATENT DOCUMENTS

| | | | |
|---|---|---|---|
| FR | 2 892 888 | A1 | 5/2007 |
| JP | 64-008388 | A | 1/1989 |
| WO | 99/39549 | A1 | 8/1999 |
| WO | WO 2004/077966 | * | 9/2004 |

OTHER PUBLICATIONS

Form PCT/IB/306 corresponding to PCT/EP2010/056051, dated May 4, 2010.

ROI Alabama Operations LLC, Demonstrating Biooil Technology for Poultry Litter Nutrient Management, Jul. 18, 2006, Alabama, XP-002561924.

Seonard Ingram, et al., Pyrolysis of Wood and Bark in an Auger Reactor: Physical Properties and Chemical Analysis of the Produced Bio-Oils, Energy & Fuels 208, vol. 22, pp. 614-625, XP-002561923, (2008).

International Search Report for PCT/EP2010/056051, dated Aug. 30, 2010.

* cited by examiner though the form of directly and continuously controlling electrical power passing through the transfer screw or the vibrating tube, makes it possible to obtain a transit time that is reproducible, short, and well suited to the material being treated.

METHOD AND APPARATUS FOR THE ENERGY DENSIFICATION OF A MATERIAL IN THE FORM OF DIVIDED SOLIDS, WITH A VIEW TO OBTAINING PYROLYSIS OILS FOR ENERGY PURPOSES

CROSS REFERENCE TO RELATED APPLICATIONS

This application is a National Stage of International Application No. PCT/EP2010/056051 filed May 4, 2010, claiming priority based on French Patent Application No. 09 02214 filed May 7, 2009, the contents of all of which are incorporated herein by reference in their entirety.

The present invention relates to energy densification of a material in divided form, in particular a biomass, in order to obtain pyrolytic oils for energy purposes.

In terms of biomasses, they may be biomasses of vegetable origin or solid particles from waste water treatment sludges. They may equally well be industrial waste, in particular polymer waste (plastics materials, rubbers, etc.).

BACKGROUND OF THE INVENTION

Devices are known for heat treating divided solids, which devices comprise at least one transfer member having at least a longitudinal axis and a helical portion mounted to rotate about said longitudinal axis inside a tubular casing, the helical portion being made of an electrically conductive material and being connected to a source of electrical power so as to constitute heating transfer means. One such device is disclosed in documents WO-A-99/39549 and FR-A-2 892 888 in the name of the Applicant.

As variants, treatment devices are also known that have a vibrating tube likewise heated by the Joule effect, as disclosed for example in documents FR-A-2 788 260 and FR-A-2 788 336.

Nevertheless, devices of those types are not suitable for treating at temperatures lying in the range 300° C. to 850° C. as is required in the field of pyrolysis where it is desired to maximize the gas phase content and thereby optimize the yield of energy densification.

In such applications, the Applicant has proposed improving the above-mentioned device by providing a tubular casing with inside walls made of refractory material, said walls then themselves constituting means for radiant heating of the mass of divided solids progressing inside the tubular casing, the intended transit times always being of the order of several tens of minutes, in particular because of the relatively slow rate of temperature rise in the material (of the order of a few tens of degrees centigrade per minute).

Under all circumstances, known pyrolysis treatments continue to have a poor operating yield, and in particular they are unsuitable for pyrolyzing a biomass in order to obtain pyrolytic oils for energy purposes.

The device of the above-mentioned documents has also been used in pyrolytic treatment specifically intended for a completely different context, namely the production of food-grade smoke, as described in document WO-A-2004/077966. Such an installation is of no advantage in the context of an application to energy densification of biomass in order to obtain pyrolytic oils for energy purposes because of the poor yield of the resulting oils, which yield may at best reach about 400 oil. Furthermore, the electrical power is used solely for heating the material up to pyrolysis temperature, such that production cost is very high.

Other pyrolysis installations are known that are designed to treat biomasses as a fluidized bed, drying them in order to increases their net calorific value, with a counterflow of a mixture of air and hot sand passing therethrough in order to achieve very fast heating of the biomass. The temperature conditions of pyrolysis are then indeed favorable for energy densification of a biomass, however the installations in question are extremely complex and it is also not possible to avoid the drawback inherent to the presence of particles of sand in the resulting pyrolytic oils, which requires filtering downstream from the installation.

In general, it appears at present difficult to implement pyrolysis of biomass in order to obtain pyrolytic oils for energy purposes while achieving simultaneously operating conditions that are favorable to such pyrolysis, good process yield, i.e. a yield of not less than about 65% oil, and reasonable production costs.

OBJECT OF THE INVENTION

An object of the invention is to propose a method and an installation for energy densification of a material in the form of divided solids, in particular a biomass, in order to obtain pyrolytic oils for energy purposes, while avoiding the above-mentioned drawbacks, i.e. a method and an installation capable simultaneously of implementing operating conditions that are favorable to pyrolysis and of obtaining high process yields (in the range 50% to 80% oil), with net calorific values (NCVs) that are as high as possible (in the range 4000 kilocalories per kilogram (kcal/kg) to 7000 kcal/kg) and to do so under conditions that are optimum in terms of energy consumption, pollution, and simplicity of implementation.

SUMMARY OF THE INVENTION

The above technical problem is solved in accordance with the invention by a method of energy densification for a material in the form of divided solids, in particular a biomass, for the purpose of obtaining pyrolytic oils for energy purposes, said method comprising the following successive steps:

preconditioning the material by heating and drying in order to raise said material to a temperature close to 100° C. and to relative humidity not exceeding about 10%;

pyrolyzing the material that is subsequently caused to flow through a substantially hermetic reactor containing at least one transfer screw or vibrating tube heated by the Joule effect, said material being heated progressively up to a temperature lying in the range 300° C. to 850° C., the electrical power passing through the transfer screw or the vibrating tube for providing heating by the Joule effect being regulated as a function of the material in order to obtain the desired temperature level during the transit time of said material through said reactor;

extracting pyrolysis gas from a high portion of the reactor for rapid recondensation thereof in a vertical condenser; and recovering pyrolytic oils from a low portion of the vertical condenser.

Thus, by the above-mentioned preconditioning, the material is ideally prepared for pyrolysis that is well adapted to the desired treatment, with simultaneously a temperature rise that is fast and a transit time through the pyrolysis reactor that is relatively short, the heat treatment naturally taking place in the absence of oxygen, i.e. with an oxygen content remaining below about 5%. In addition, regulating electrical power as a function of the material in question, which is simple to implement, serves to minimize energy consumption considerably, since it suffices to maintain the temperature level during treatment.

Provision can be made for the transit time of the material in the pyrolysis reactor to lie in the range a few seconds to a few tens of minutes.

Preferably, prior to the preconditioning step, the material in the form of divided solids is stored with a grain size lying in the range 10 micrometers (μm) to 1 millimeter (mm), preferably in the range 100 μm to 300 μm, and at relative humidity lying in the range 1% to 12%, and preferably in the range 5% to 10%. By having fine grain size, it is ensured that reaction kinetics are fast, and by having humidity as low as possible, it is ensured that the oils that are obtained are rich in terms of net calorific value.

Also advantageously, pyrolytic gas extraction is performed in the last portion of the reactor relative to the travel direction of the material, with temperature being maintained until the gas reaches the vertical condenser. Maintaining temperature in this way serves to avoid condensing the tars contained in the pyrolysis gas too soon.

It is then preferable for the pyrolysis gas to be cooled rapidly on entering into the vertical condenser by said gas passing between tubes having a refrigerant fluid flowing therethrough at a temperature of about 0° C. In particular, the pyrolysis gas passes between a bundle of vertical tubes so that the trickling of the condensates serves to clean said tubes.

The method preferably also includes removing non-condensable fractions of the pyrolysis gas from the high portion of the vertical condenser for the purpose of rapidly burning said fractions in a burner or in order to recycle them in a hot air dryer used for preconditioning the material. In particular, the non-condensable fractions are removed by forced extraction via a droplet-remover.

Also advantageously, the method also includes extracting the residual coke at the outlet from the reactor in a low portion thereof for the purpose of cooling said coke in the absence of oxygen in a sealed cooler. In particular, the residual coke is cooled progressively in the sealed cooler so as to leave it in the form of biochar or the like at a temperature not exceeding about 50° C.

The invention also provides an installation for implementing a method for energy densification of a material in the form of divided solids, in particular a biomass, in order to obtain pyrolytic oils for energy purposes, said installation being remarkable in that it comprises:
  a preconditioning device serving to heat and to dry the material to prescribed values of temperature and relative humidity;
  a pyrolysis reactor having its inlet connected in sealed manner to the outlet of the preconditioning device, said reactor being fitted with at least one transfer screw or vibrating tube heated by the Joule effect, means being provided for regulating the electrical power conveyed by the transfer screw or the vibrating tube as a function of the material in order to heat it by the Joule effect; and
  a vertical condenser having its inlet connected to an outlet tapping from the pyrolysis reactor, enabling the condensable fractions of a portion of the pyrolysis gas to be condensed, an outlet in a low portion of said condenser serving to recover the resulting pyrolytic oils.

In a first embodiment, the preconditioning device comprises a double-walled auger conveying a hot fluid, and a transfer screw mounted to rotate in said auger at a constant and regulated speed, said auger being fitted in a high portion with an upstream feed hopper and with an outlet for removing vapor.

In another embodiment, the preconditioning device comprises a hot air dryer fitted with a conveyor belt through which the hot air passes.

Also advantageously, the pyrolysis reactor comprises a closed enclosure having walls made of refractory material. In particular, the closed enclosure of refractory material is connected via rotary feeder valves: at a high inlet to the preconditioning device; and at a low outlet to a sealed cooler for cooling the residual coke in the absence of oxygen.

The closed enclosure of refractory material may optionally include a tube in a high portion enabling a reaction gas or an inert gas to be injected therein.

Also preferably, both ends of the transfer screw heated by the Joule effect are arranged outside the closed enclosure of refractory material, said ends being cooled prior to being connected to electricity feed means associated with an electrical power unit.

Also advantageously, the outlet tapping from the pyrolysis reactor is connected to a vertical condenser via an associated pipe fitted over its entire length with electrical or fluid-flow temperature-maintaining means.

It is also advantageous to make provision for the vertical condenser to be internally fitted with a bundle of vertical tubes in which a refrigerant fluid flows.

Also preferably, the vertical condenser presents an outlet in its high portion for removing non-condensable fractions of the pyrolysis gas, said outlet being connected via an associated pipe to a burner. In particular, the pipe leading to the burner includes an extractor fan operating in suction and adjusted to maintain suction in the pyrolysis reactor. Finally, the pipe leading to the burner may be fitted with a droplet-remover upstream from the extractor fan.

Other characteristics and advantages of the invention appear more clearly in the light of the following description given with reference to the accompanying drawings relating to a particular example of the method and the installation in accordance with the invention for energy densification.

BRIEF DESCRIPTION OF THE DRAWINGS

Reference is made to the figures of the accompanying drawings, in which.

DETAILED DESCRIPTION OF THE INVENTION

Figure 1:
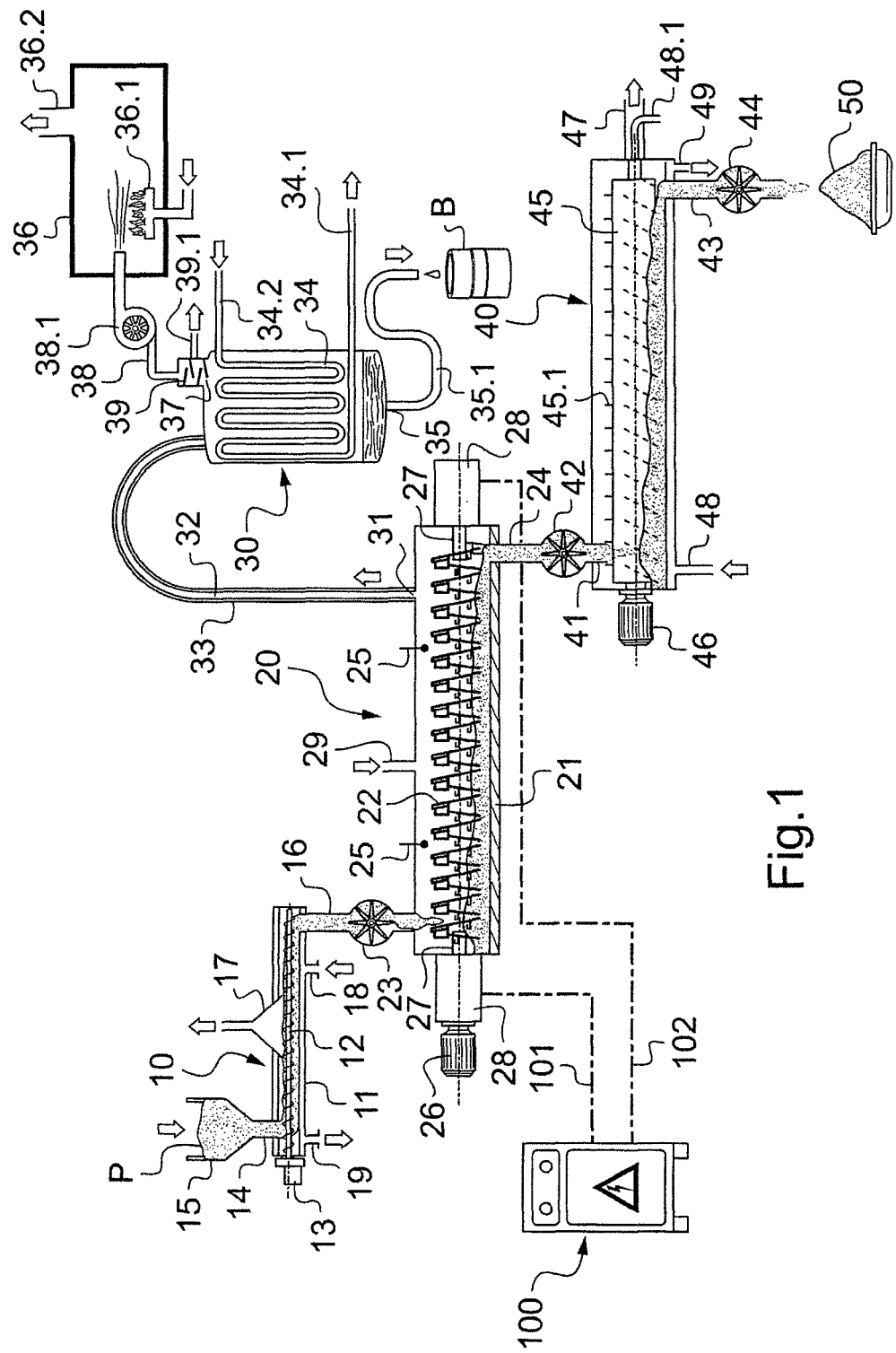
FIG. 1 is a diagram of an energy densification installation in accordance with the invention, implementing the method of the invention.

FIG. 1 is a diagram of an installation (1) for treating a material in divided solid form, in particular a biomass, with energy densification of the material in order to obtain pyrolytic oils for energy purposes.

The material in question is generally a biomass, where this term covers the biodegradable fractions of materials, wastes, and residues coming from agriculture, forestry, and related industries, and in particular biomasses of vegetable origin or solid fractions of sludge from waste water treatment, and biodegradable fractions of industrial and municipal waste. Nevertheless, the invention may be applied to treating other industrial waste that does not come within the above definition of biomass, for example polymer waste (plastics materials, rubbers, . . . ).

In general, the materials in question are divided solids that are capable of producing pyrolytic oils when they are raised to temperatures in the range 300° C. to 800° C. in the absence of oxygen, said oils having energy or chemical content suitable for being recycled.

The material for treatment is referenced (P) and it is initially introduced into a preconditioning device (10) for heating and drying to prescribed values for temperature and relative humidity.

The preconditioning device (10) comprises a double-walled auger (11) having a hot fluid passing therethrough, with the associated fluid flow circuit having an inlet (18) and an outlet (19). A transfer screw (12) is mounted to rotate inside the double-walled auger (11), being driven by an associated external motor (13). The double-walled auger (11) has an inlet (14) connected to a feed hopper (15). The material (P) is loaded into and stored in the hopper (15), which hopper may be fitted with (high and low) level sensors and with a mechanical bridge-breaking system so as to avoid bridging phenomena and banking that would prevent the material from being removed.

It is important for the stored material (P) to present small grain size, lying in the range 10 μm to 1 mm, and preferably in the range 100 μm to 300 μm, and relative humidity that is likewise low, lying in the range 1% to 12%, and preferably in the range 5% to 10%.

Selecting these grain size and humidity criteria guarantees that the material is ideally conditioned for being pyrolyzed as quickly as possible.

The metering screw (12) of the preconditioning device (10) of the double-walled type with a hot fluid passing therethrough serves simultaneously to convey the material at a constant and regulated speed into the pyrolysis reactor (20) that is connected downstream from said preconditioning device, with this being made possible by variable-frequency drive, and also to dry and heat the material by passing a heat transfer fluid through the double wall.

By means of the preconditioning device, the material is raised to a temperature close to 100° C., with relative humidity that does not exceed about 10%, thereby enabling already-hot material to penetrate into the pyrolysis reactor, thus greatly enhancing the temperature rise of said material. It should be recalled that fast temperature rise is essential during the pyrolysis reaction in order to increase the oil content that is produced, with this temperature rise being enhanced with increasing temperature and dryness of the material, it being possible to reach rates of several hundreds of degrees Celsius per second.

The double-walled auger (11) is also fitted, in a high portion, with an outlet (17) for removing vapor, this outlet possibly being fitted with a fan type extractor (not shown).

Nevertheless, care must be taken to ensure that the temperature of the material in the double-walled auger (11) does not become too high, so as to avoid prematurely starting the reaction for transforming the material in this zone of the installation, before it has penetrated into the pyrolysis reactor. The material penetrating into the pyrolysis reactor is thus at a temperature of about 100° C., and at relative humidity no greater than about 100, and preferably lying in the range 5% to 7%.

The material as heated and dried in this way in the preconditioning device (10) leaves said device via an outlet (16) in order to penetrate into a pyrolysis reactor (20) having its inlet (22) connected in leaktight manner to the outlet from the preconditioning device (10). Specifically, sealing is provided by a rotary feeder valve (23).

The pyrolysis reactor (20) is fitted with at least one transfer screw (22) that is heated by the Joule effect, said screw serving both to transfer and to heat the material traveling through said reactor. The pyrolysis reactor (20) comprises a closed enclosure (21) having walls that are preferably made of refractory material.

In this example, the single transfer screw (22) that is heated by the Joule effect thus serves to drive the material from upstream to downstream with pyrolysis conditions being set both to a temperature level lying in the range 300° C. to 850° C. and to a transit time through the reactor that is a function of the material, and that lies in particular between a few seconds and a few tens of minutes.

It is known that fast pyrolysis, by degrading the lignin contained in the biomass, enhances the formation of high molecular weight phenol groups (weighing at least 300 daltons (Da)) that also correspond to molecules having a higher net calorific value as looked for in this application. Conversely, a slow temperature rise, at a few degrees Celsius per second, and thus a relatively long transit time for the material through the pyrolysis reactor can enhance the formation of acetic acid, which can contribute to modifying the degradation of lignin into phenol groups of smaller molecular weight (less than 300 Da), of lower net calorific value but of aromatic power that is more advantageous, which explains why operating conditions of this type are selected when producing smoke flavorings (liquid smokes) by slow pyrolysis of sawdust, as mentioned above.

Thus, in the context of this pyrolysis, the material is heated progressively up to a temperature in the range 300° C. to 850° C., with a transit time through the pyrolysis reactor (20) lying for example between a few seconds and a few tens of minutes.

Both ends (27) of the heating screw (22) project out from the closed enclosure (21) of refractory material, and these ends are cooled before being connected to associated electrical power supply means at blocks (28) that are shown diagrammatically. Both ends of the shaft of the spiral that pass through the refractory walls are thus cooled before being connected to respective means for connection to the terminals for feeding electric current. The temperature of the shaft needs to be brought down to below 100° C. so it is preferable to use a series of air cooling fins fastened on the shaft, or cooling means that use a liquid. Both ends of the shaft of the core-less spiral are connected to a set of brushes and brush-carriers serving to make connections to the two polarities of an alternating or rectified electrical power supply at low voltage and high current. The power conveyed by the spiral turns is regulated by a thyristor electronic dimmer as a function of the desired and programmed temperature for the spiral turns. One of the ends of the shaft of the heating screw (22) is thus connected to a motor and gearbox unit represented diagrammatically at (26), controlled by a variable-frequency drive so as to adjust the speed of rotation of the screw as a function of the desired and programmed transit time for the material.

In accordance with a characteristic of the method of the invention, the electrical power that serves to provide heating by the Joule effect is regulated as a function of the material in order to maintain the desired temperature level throughout the transit time of the material through the reactor (20), and also in order to reach a threshold for a reaction that is self-sustaining.

Such electrical regulation is very simple to implement using temperature sensors, and it serves to minimize energy consumption significantly since it suffices to maintain the temperature level during the treatment.

Thus, an electrical power unit, represented here by a cabinet (100), is connected to various control members and to various sensors and serves to control the assembly. Two connections are represented diagrammatically herein by chain-dotted lines referenced 101 and 102. Temperature sensors are arranged along the enclosure (21) of refractory material so as to measure the temperature that exists inside said enclosure all along its length. Two such sensors (25) are shown herein for measuring the temperature of the top of the enclosure. The closed enclosure (21) of refractory material also includes in this example, in its upper portion, a pipe (29) enabling a reaction gas to be injected, or an inert gas such as nitrogen in the event of a predetermined value being exceeded, the gas-injection safety device being connected to receive the temperature as measured in the top of the oven. In general, a device is also provided to measure the temperature of the material as it progresses along the oven, in order to record temperature profiles during the pyrolysis reaction, together with a device for measuring the temperature of the spiral turns, since that is the temperature that is regulated by the electrical power supply, so the spiral turns are heated as a function of a predetermined and parameterized value.

The closed enclosure (21) which, together with its cover, is made of a refractory material (e.g. refractory cement or refractory ceramic), serves to optimize the heating of the material by the heating screw (22) up to a temperature such that the effect of return heating from the ceramic on the material due to convection and to radiation contributes to the particles of biomass being heated immediately, quickly, and intensely, in addition to the direct heating of the material as performed by the screw itself.

The installation is preferably started without preheating the oven so as to avoid any risk of the already-hot divided biomass catching fire on being inserted into the oven. The oven becomes heated while the material begins to travel thereal-ong, thereby depleting the oxygen content of the ambient air inside the oven as the biomass is subjected to the effect of temperature and begins its thermal decomposition. Since the atmospheric in the oven becomes depleted in oxygen, down to a residual level of about 5%, it is possible to obtain conditions for pyrolysis of the biomass that are completely safe. These conditions also enhance preponderant formation of pyrolytic oils of high net calorific value.

In accordance with another characteristic of the method of the invention, provision is made to extract pyrolysis gas from the upper portion of the pyrolysis reactor (20) in order to condense it quickly in a vertical condenser (30). The term "pyrolysis gas" is naturally used herein in conventional manner to designate a mixture of oils, water, and incondensable gases.

A vertical condenser (30) is thus provided having its inlet connected to an outlet tapping (31) of the pyrolysis reactor (20), the vertical condenser serving to condense the condensable fractions of a portion of the pyrolysis gas, said condenser presenting a low outlet (35) for recovering the resulting pyrolysis oils. The outlet tapping (31) of the pyrolysis reactor (20) is preferably positioned on its side, in the last portion of the pyrolysis reactor (20).

It is also advantageous for pyrolysis gas extraction to be performed while maintaining the temperature of the gas until it reaches the vertical condenser (30). Keeping the pyrolysis gas at a temperature that is at least equivalent to that which exists in the upper portion of the oven serves to avoid any risk of premature condensation of oils. The distance between the gas outlet of the oven and the inlet to the vertical condenser should also be as short as possible, in order to avoid dust stagnating in this zone, since that could lead to deposits forming and to the diameter of the tapping outlet (31) narrowing. The connection between the pyrolysis reactor (20) and the vertical condenser (30) is provided specifically by an associated pipe (32) fitted along its entire length with electrical or fluid flow means (33) for maintaining its temperature.

These means (33) may be an electrical track or a fluid flow installation serving to maintain the desired temperature. This serves to prevent premature condensation of oils which might otherwise lead to tars.

This portion of the pyrolysis gas is cooled quickly on entering into the vertical condenser (30) by said gas passing between tubes (34) having a refrigerant fluid flowing therein, e.g. at a temperature of about 0° C. The inlet of the refrigerant fluid circuit is referenced (34.2) and its outlet is referenced (34.1). Preferably, the portion in question of the pyrolysis gas enters the vertical condenser (30) directly in a low side portion thereof.

It is then particularly advantageous for the vertical condenser (30) to be fitted with a bundle of vertical tubes (34) so that the trickling condensates serve to clean said tubes.

Cooling the smoke fast is most important in order to perform condensation fast. In this context, the vertical arrangement of the condenser is advantageous since it enables the tubes to be cleaned by the condensate trickling down them, given that the low-viscosity liquid fractions condense at lower temperature and thus in the upper portion of the tubes, thereby cleaning and dissolving heavier molecules of greater viscosity that have condensed further down the tubes. At the bottom of the vertical condenser (30), there are to be found the heavy fractions that condense rapidly at high temperature.

It can be understood that fast condensation of this portion of the pyrolysis gas is important, in order to avoid recombination.

In parallel with condensable fractions of the pyrolysis gas condensing in order to recover the resulting pyrolytic oils, provision is made to remove the non-condensable fractions (constituted by gas and possibly also drops of oil) via a high outlet (37) of the vertical condenser (30). This outlet (37) is connected by an associated pipe (38) to a burner (36). The pipe (38) advantageously leaves the condenser (30) sideways from a high portion thereof, thus serving to remove non-condensable fractions of the smoke, which fractions may represent 5% to 15% by weight of the total amount of treated biomass. The pipes (38) leading to the burner (36) includes an extractor fan (38.1) operating by suction and adjusted to maintain the pyrolysis reactor (20) at low pressure. This serves to achieve forced extraction of the non-condensable fractions of the smoke. Provision may possibly be made upstream from the extractor fan (38.1) for a droplet remover (39) serving to trap oil droplets that have not condensed. This droplet-remover (39) thus serves to eliminate and collect as many as possible of the droplets of oil that might still be present. The droplet-remover (39) is provided for this purpose with an outlet (39.1) for collecting the droplets of oil. At the outlet from the extractor fan (38.1) the gas is sent to the burner (36) where combustion is sustained by gas, oil, or biomass-fueled burners (36.1) ensuring complete combustion of the gas from the process. Combustion flue gases are exhausted upwards via an exhaust chimney (36.2) from the burner.

The conditions to be applied for ensuring complete combustion of the gas and complete deodorization thereof are, in combination, a treatment temperature of about 850° C. and a transit time in the burner of about 2 seconds.

In the bottom portion of the vertical condenser (30), it is possible to install a sleeve fitted with a valve (not shown) leading to a vessel for recovering pyrolytic oils, as represented specifically by a circuit (35.1). Advantageously, the low portion of the vertical condenser (30) has a dead volume serving to retain oils during a loading time, with loading taking place after the isolation valve of the vessel has been closed. The temperature of the oils as recovered in this way and stored in drums (B) lies in the range 40° C. to 80° C. In practice, before final packaging of the oils in drums (B), the oils are filtered via a filter (not shown) of about 5 μm.

The vertical condenser (30) may be fitted with a spray system (not shown) for using a liquid fluid to clean the tubes. The cleaning fluid may be water with added soda for a cleaning cycle that is distinct from a production stage. In another mode of operation, it is possible to opt for direct spraying of a portion of the condensed and cooled oils. Such an operation can be performed continuously during a production stage.

An outlet is also provided for the products that result from pyrolysis, and that remain in solid form, generally in the form of residual coke.

Specifically, an outlet (24) is provided from the pyrolysis reactor (20), which outlet is connected via a rotary feeder valve (42) to the inlet (41) of a sealed cooler (40).

The sealed cooler (40) is fitted internally with a double-walled screw (45) fitted on the outside with transfer fins (45.1), this double-walled screw being rotated by an external motor (46), while passing a fluid (water or oil under pressure) for cooling the coke quickly (in a few minutes). The associated cooling fluid circuit is shown diagrammatically as having inlets (48) and (48.1) and an outlet (49). The exhaust gas leaves via a downstream outlet (47). The inlets (48) and (48.1) are preferably directly connected to the outlet (34.1) of the vertical condenser (30), and the outlet (47) is preferably connected via a cooling unit (not shown in FIG. 1) to the inlet (34.2) of the vertical condenser (30).

This serves to cool the residual coke in the absence of oxygen down to a temperature of no more than 50° C., thus enabling the coke to be discharged to the outside in complete safety. Discharge takes place via a low outlet (43) of the sealed cooler (40) via a rotary feeder valve (44) in order to produce a recyclable residual heap (50) of biochar or the like. As an indication, the proportion of coke constitutes about 1% to 25% of the weight of the treated biomass.

The sealing between the gas contained in the process and outside air is thus guaranteed by the rotary feeder valves (42 and 44), thereby guaranteeing the sealing that is needed for safety reasons, by preventing any presence of oxygen that might run the risk of causing an explosion.

Figure 2:
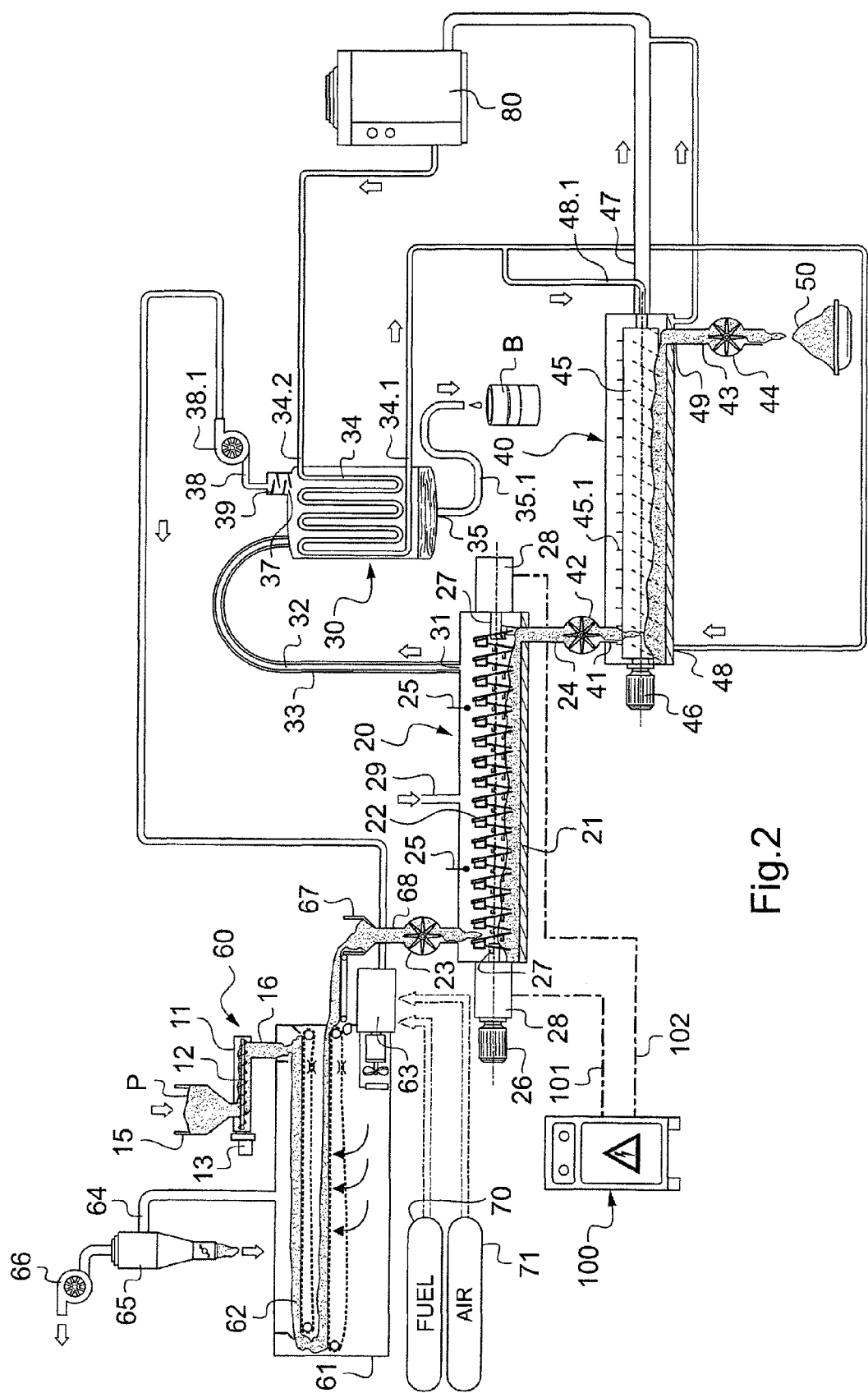
FIG. 2 shows a variant of the above installation, using another type of preconditioning device.
Figure 3:
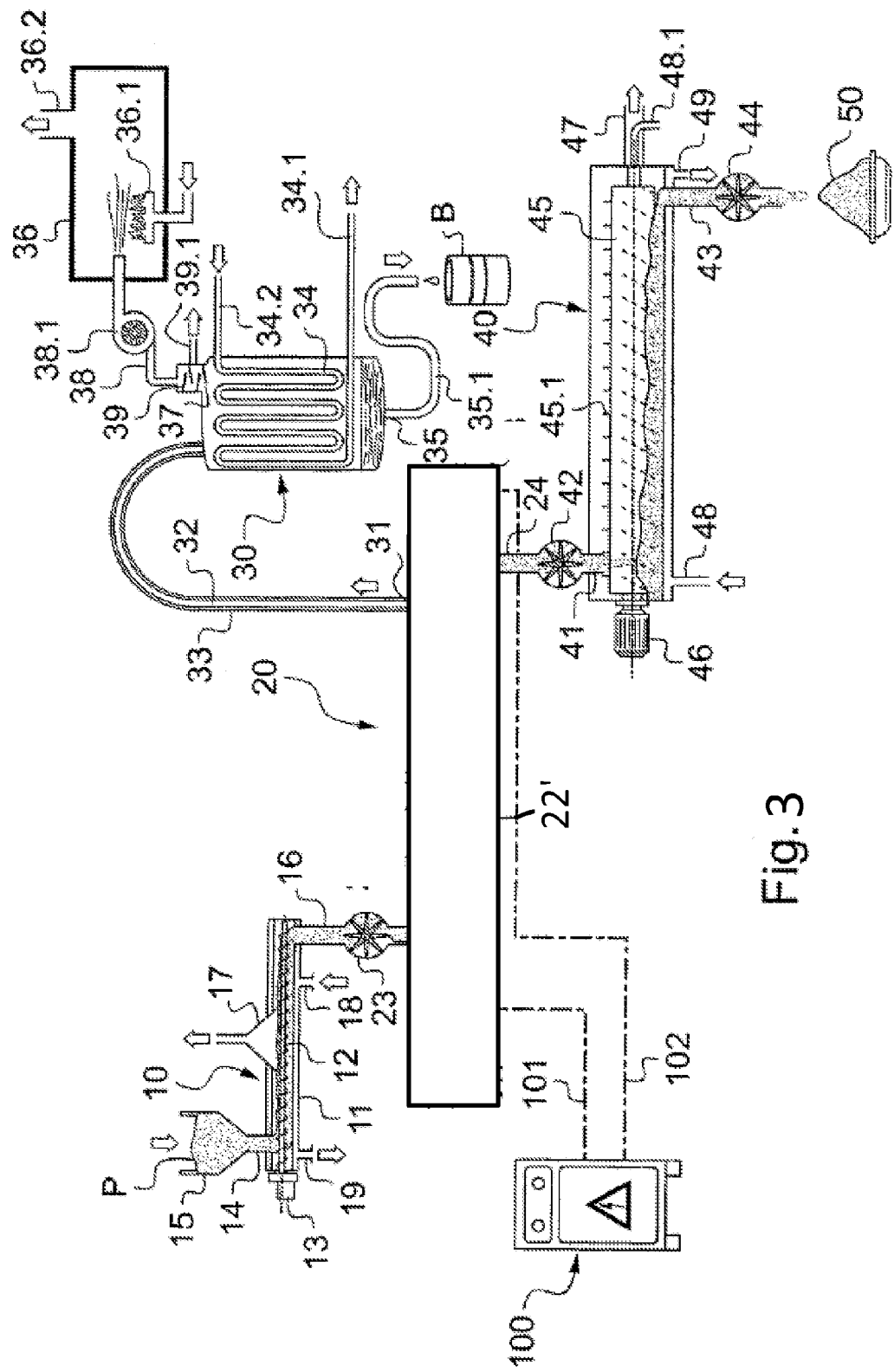
FIG. 3 shows a variant installation having a vibrating tube.

FIG. 2 shows a variant of the FIG. 1 installation in which the preconditioning device (60) includes a hot air dryer (61) fitted with an endless belt (62) through which hot air passes.

The outlet (16) from the feed auger (11) now leads to the inlet of the hot air dryer (61) which has an endless conveyor belt (62) of length that is a function of the treatment capacity of the method. The belt (62), here arranged in two superposed layers, presents an open mesh (e.g. a mesh size of 2 mm to 5 mm, so as to pass the hot air that is used for heating and drying the material for treating. The hot air taken from a blower unit (63) is at a temperature of about 140° C. and it then passes in succession through the two stages of the belt, thus picking up the moisture contained in the material. A high outlet (64) from the dryer enclosure (61) serves to exhaust this moisture-laden hot air to a cyclone (65), with extraction being performed by an extractor fan (66).

At the outlet from the hot air dryer (61), the material passes onto a conveyor belt so as to reach a hopper (67) having its outlet (68) feeding the inlet of the rotary feeder valve (23) of the FIG. 1 installation.

There can also be seen recycling of the incondensable gas that leaves the vertical condenser (30) via the circuit (38) and the droplet-remover (39) and the extractor fan (38.1), which gas is recycled directly to the inlet of the lower unit (63): this incondensable gas is thus recycled by being used as fuel associated with the burner of the hot air blower unit, which burner is already fed with fuel (gas or oil) and with air from associated sources (70, 71).

FIG. 2 also shows more clearly the fluid and gas circuit associated with the vertical condenser (30) and the sealed cooler (40), together with its refrigerator unit (80).

A method and an installation are thus provided for energy densification of biomass or other waste in order to obtain pyrolytic oils for energy use, making it possible simultaneously to implement pyrolysis conditions that are very fast and to have a high yield for obtaining pyrolytic oils, in particular a yield that commonly reaches 65% to 75% of oil, with a high net calorific value (in the range 4000 kcal/kg to 7000 kcal/kg), and in spite of a small volume, being competitive and presenting a production cost that is very reasonable (because of the electrical regulation). It is thus possible to treat about one metric ton of material per hour.

In addition, the general installation is of relatively simple structure insofar as its components are known in isolation as to their general structure, and while avoiding the above-mentioned drawbacks of certain prior art pyrolysis techniques that make use of streams of air and hot fans.

The biomasses in question are selected in practice as a function of the pyrolytic oils that it is desired to obtain, with the specific features of these oils determining their subsequent applications, for heating, for fueling engines, for green chemistry, or for fractionating, etc.

The method and the installation of the invention thus make it possible to open up developments with an outlook that is most advantageous in the context of renewable energy and biofuels.

The invention is not limited to the above-described embodiment, but on the contrary covers any variant using equivalent means to reproduce the above-specified characteristics.

Thus, for example, it is possible to make provision for feeding the heater screw with electricity via a generator unit that is itself powered by the biomass, or indeed by solar panels (independent power supply that is advantageous for sites that are isolated or located in a desert).

It is also possible to replace the heater screw by a vibrating tube 22' that is itself heated by the Joule effect, with the material then being transferred within a helical tube having a vertical axis (variants not shown herein).

What is claimed is:
1. A method of energy densification for a material in the form of divided solids for the purpose of obtaining pyrolytic oils for energy purposes that have high net calorific values in a range of 4000 kilocalories per kilogram to 7000 kilocalories per kilograms, wherein the method comprises the following successive steps:
preconditioning the material by heating and drying in order to raise said material to a temperature close to 100° C. and to relative humidity not exceeding about 10% in a dedicated preconditioning device;
pyrolyzing the material that is subsequently caused to flow through a substantially hermetic reactor containing at least one transfer screw or vibrating tube heated by the Joule effect, said reactor being distinct, independent and downstream from the dedicated preconditioning device, said material being heated progressively up to a temperature lying in the range 300° C. to 850° C. and with a fast temperature rise of several hundreds of degrees Celsius per second, the electrical power passing through the transfer screw or the vibrating tube for providing heating by the Joule effect being regulated as a function of the material in order to obtain the desired temperature level during the transit time of said material through said reactor;

extracting pyrolysis gas from a high portion of the reactor for rapid condensation thereof in a vertical condenser; and recovering pyrolytic oils that have the high net calorific values from a low portion of the vertical condenser.

2. The method according to claim 1, wherein the transit time of the material in the pyrolysis reactor lies in the range a few seconds to a few tens of minutes.

3. The method according to claim 1, wherein, prior to the preconditioning step, the material in the form of divided solids is stored with a grain size lying in the range of 10 μm to 1 mm, and at relative humidity lying in the range of 1% to 12%.

4. The method according to claim 3, wherein pyrolytic gas extraction is performed in the last portion of the reactor relative to the travel direction of the material, with temperature being maintained until the gas reaches the vertical condenser.

5. The method according to claim 4, wherein the pyrolysis gas is cooled rapidly on entering into the vertical condenser by said gas passing between tubes having a refrigerant fluid flowing therethrough at a temperature of about 0° C.

6. The method according to claim 5, wherein the pyrolysis gas passes between a bundle of vertical tubes so that the trickling of the condensates serves to clean said tubes.

7. The method according to claim 5, including removing non-condensable fractions of the pyrolysis gas from the high portion of the vertical condenser for the purpose of rapidly burning said fractions in a burner or in order to recycle them in a hot air dryer used for preconditioning the material.

8. The method according to claim 7, wherein the non-condensable fractions are removed by forced extraction via a droplet-remover.

9. The method according to claim 1, also including extracting the residual coke at the outlet from the reactor in a low portion thereof for the purpose of cooling said coke in the absence of oxygen in a sealed cooler.

10. The method according to claim 9, wherein the residual coke is cooled progressively in the sealed cooler so as to leave it in the form of biochar or the like at a temperature not exceeding about 50° C.

11. The method according to claim 1, wherein, prior to the preconditioning step, the material in the form of divided solids is stored with a grain size lying in the range of 100 μm to 300 μm and at relative humidity lying in the range of 5% to 10%.

* * * * *